(12) United States Patent
Tilaye et al.

(10) Patent No.: US 10,187,146 B2
(45) Date of Patent: Jan. 22, 2019

(54) LIGHT CONVERTING DEVICE

(71) Applicant: Echostar Technologies L.L.C., Englewood, CO (US)

(72) Inventors: Swapnil Anil Tilaye, Superior, CO (US); Nicholas Brandon Newell, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 179 days.

(21) Appl. No.: 15/268,679

(22) Filed: Sep. 19, 2016

(65) Prior Publication Data

US 2018/0083701 A1 Mar. 22, 2018

(51) Int. Cl.
*H04B 1/00* (2006.01)
*H04B 10/116* (2013.01)
*H04B 10/50* (2013.01)
*H04B 10/572* (2013.01)
*H04B 10/66* (2013.01)
*H04B 10/40* (2013.01)

(52) U.S. Cl.
CPC ........... *H04B 10/116* (2013.01); *H04B 10/40* (2013.01); *H04B 10/502* (2013.01); *H04B 10/572* (2013.01); *H04B 10/66* (2013.01)

(58) Field of Classification Search
CPC .... H04B 10/40; H04B 10/502; H04B 10/572; H04B 10/66
See application file for complete search history.

(56) References Cited

U.S. PATENT DOCUMENTS

| | | | |
|---|---|---|---|
| 4,665,430 A | 5/1987 | Hiroyasu | |
| 5,309,541 A | 5/1994 | Flint | |
| 5,438,445 A * | 8/1995 | Nakano | H04J 14/0201 398/79 |
| 5,469,236 A | 11/1995 | Roessel | |
| 5,581,447 A | 12/1996 | Raasakka | |
| 5,729,394 A | 3/1998 | Sevier et al. | |
| 5,835,458 A | 11/1998 | Bischel et al. | |
| 7,021,777 B2 | 4/2006 | Amitai | |
| 7,042,631 B2 | 5/2006 | Smith et al. | |
| 7,526,153 B2 | 4/2009 | Uchida | |
| 7,655,934 B2 | 2/2010 | Gorrell et al. | |
| 9,203,342 B2 | 12/2015 | Rongve et al. | |
| 2002/0171896 A1 | 11/2002 | Clark et al. | |
| 2003/0174659 A1 * | 9/2003 | Handelman | H04J 14/02 370/280 |
| 2004/0004780 A1 | 1/2004 | Watanabe | |
| 2005/0201707 A1 | 9/2005 | Glebov et al. | |
| 2008/0044143 A1 | 2/2008 | Wang et al. | |
| 2009/0148931 A1 | 6/2009 | Wilkerson et al. | |
| 2011/0013868 A1 | 1/2011 | Suzumura et al. | |

(Continued)

OTHER PUBLICATIONS

U.S. Appl. No. 15/268,677, Non-Final Office Action dated Jan. 19, 2017 (15 pages).

*Primary Examiner* — Tesfaldet Bocure
(74) *Attorney, Agent, or Firm* — Bejin Bieneman PLC

(57) ABSTRACT

A light converter apparatus can receive a first light beam originated from a first Li-Fi device with a first wavelength. The first light beam may have data encoded therein. The light converter apparatus can receive the first light beam and convert the first wavelength to a second wavelength, and transmit a second light beam with the second wavelength to a second Li-Fi device.

19 Claims, 4 Drawing Sheets

(56) References Cited

U.S. PATENT DOCUMENTS

| | | |
|---|---|---|
| 2013/0182620 A1 | 7/2013 | Chaffee et al. |
| 2014/0186051 A1* | 7/2014 | Hayakawa ......... H04B 10/1143 398/127 |
| 2016/0174347 A1* | 6/2016 | Parello ............... H05B 37/0272 315/294 |
| 2016/0223986 A1* | 8/2016 | Archambeau ............ G03H 1/02 |

* cited by examiner

LIGHT CONVERTING DEVICE

BACKGROUND

Growing demand for media content means there is a growing need for bandwidth not just to, but within, a customer premises. For example, for playback of high resolution video on wireless devices, needed bandwidth, e.g., via existing radio-based technologies such as LTE (long term evolution) wireless communications, and Wi-Fi communications, i.e., according to IEEE 802.11, is often not available. Another technology for supporting high bandwidth media transmissions is Li-Fi, i.e., Light Fidelity, communications. Using the visible light spectrum, Li-Fi technology can transmit data thousands of times faster than existing radio spectrum based technologies. However, Li-Fi requires that devices receiving a data transmission be in a line-of-sight of a Li-Fi transmitter, i.e., photo detectors of a Li-Fi receiver have to be able to actually "see" the transmitted light in order to capture the data. Additionally, Li-Fi devices may use visible light to transmit data which may cause distraction or discomfort for a user of a Li-Fi device in a dark area.

DETAILED DESCRIPTION

Introduction

Figure 1:
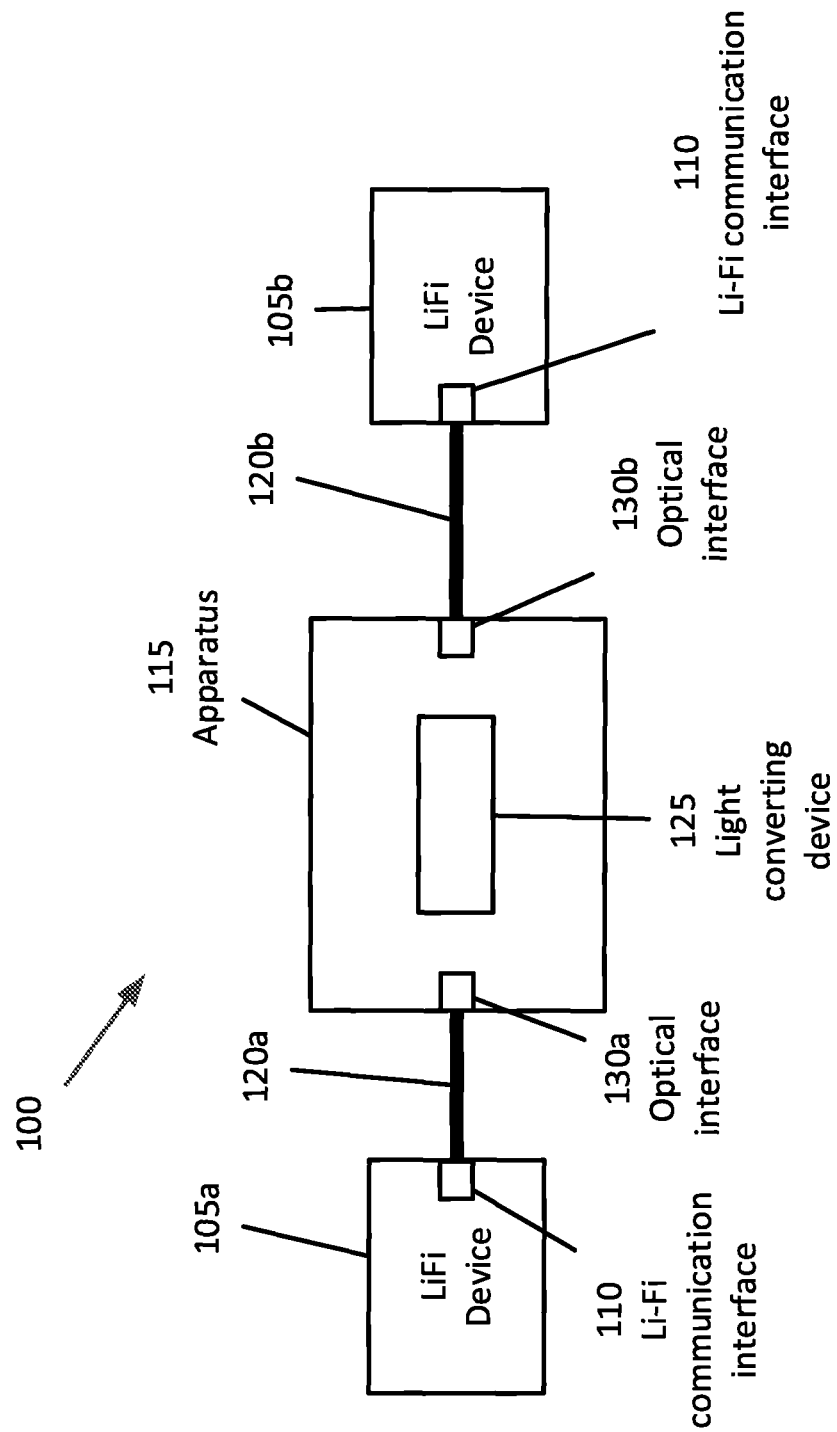
FIG. 1 is a perspective view of an exemplary system including an exemplary light converter apparatus.

A light converter apparatus can receive a first light beam originated from a first Li-Fi device 105 with a first wavelength. The first light beam may have data encoded therein. The light converter apparatus can receive the first light beam and convert the first wavelength to a second wavelength, and transmit a second light beam with the second wavelength to a second Li-Fi device 105. For example, the first light beam may be in a visible light spectrum and the second light beam in an invisible light spectrum, e.g., to communicate with the second Li-Fi device 105 in a dark area. The data encoded in the first light beam can be preserved, and encoded in the second light beam.
System Elements Light Fidelity (Li-Fi) is a bidirectional, high-speed and fully networked visible light communication technology similar to Wi-Fi, and like Wi-Fi uses specifications from the well-known IEEE 802.11 family of standards. Wavelengths of light beams used in Li-Fi communication may be in a visible light spectrum, i.e., visible to human eyes, or in an invisible light spectrum, i.e., invisible to human eyes. In one example, a Li-Fi device 105 may transmit light beams in both visible and invisible wavelengths, e.g., an Internet router light bulb may produce visible light to illuminate an area and invisible light to transmit data. Li-Fi provides much higher bandwidth than technologies such as Wi-Fi that use radio frequency waves. For example, Li-Fi data rates over 10 Gbit/s (gigabits per second) have been measured. FIG. 1 illustrates an example system 100 including Li-Fi devices 105a, 105b communicating via Li-Fi through a light converter apparatus 115.

Li-Fi devices 105 may include mobile devices, personal computers, tablet computers, internet routers, light bulbs, etc., which include a Li-Fi communication interface 110 such as Light Emitting Diodes (LEDs) as are known. For example, as shown in FIG. 1, a Li-Fi device 105a may include a Li-Fi communication interface 110 to provide internet router functionality in a customer premises. The Li-Fi devices 105a, 105b communicate via the light converting apparatus 115. In one example, the Li-Fi devices 105a, 105b may be separated by an obstacle, e.g., a wall or a door. Additionally or alternatively, two Li-Fi devices 105 such as mobile devices with Li-Fi communication interface 110 may communicate via the apparatus 115, e.g., transferring digital media content data such as a movie between the Li-Fi devices 105.

As is known, a Li-Fi communication interface 110 of a Li-Fi device 105 may transmit and/or receive data to and/or from other Li-Fi devices 105 via one or more light beams 120. In one example, data is included in a transmitted light beam 120 by light intensity fluctuations, e.g., by turning the light beam 120 on and off according to a pattern that encodes the data. Therefore, fluctuations of the light beam 120 intensity are not discernable by human eyes. Additionally or alternatively, a Li-Fi device 105 could simultaneously emit multiple light beams 120, each carrying encoded data independently from one another. In one example, multiple emitted light beams 120a have a wavelength different from wavelength of other light beams included in the light beam 120a, although all may be in the visible light spectrum.

A Li-Fi communication interface 110 may include one or more light transceivers to emit and/or receive one or more light beams as are known. A light transceiver of a Li-Fi device 105 may include a light emitter that transmits one or more light beams, including data, that may be received by one or more other Li-Fi devices 105. A Li-Fi device 105 light transceiver may further include one or more light sensors as are known to receive, from other Li-Fi devices 105, light beams that include data.

The light converter apparatus 115 includes a light converting circuit 125 and two optical interfaces 130 optically coupled with the light converting circuit 125. The light beam(s) 120a for Li-Fi communication between the Li-Fi device 105a and the apparatus 115 are typically in a visible light spectrum, i.e., visible to human eyes. Light beam(s) 120b for Li-Fi communication between the Li-Fi device 105b and the apparatus 115 are typically in an invisible light spectrum, i.e., invisible to human eyes. Other arrangements are possible, e.g., invisible light beams 120a converted in the apparatus 115 to visible light beams 120b, invisible light beams 120a at a first wavelength converted to invisible light beams 120b at a second wavelength, etc.

The apparatus 115 is typically programmed to apply an encoding/decoding scheme to light beams 120 that it receives and transmits. For example, the apparatus 115 can receive a light beam 120a from a first Li-Fi device 105a. The first light beam 120a may be in the visible light spectrum. The apparatus 115 is programmed to decode a data from the first light beam 120, e.g., to recognize a change of light intensity such as flashing ON and OFF according to one or more predetermined patterns. The apparatus 115 could be further programmed to emit a second light beam 120b, e.g., by changing intensity of emitted light such as turning the light beam 120B ON and OFF.

As discussed above, multiple beams 120 which independently transfer data may be transmitted and/or received simultaneously by the devices 105 and/or apparatus 115. Further, a same set of data may be provided from a first Li-Fi device 105a and to a second Li-Fi device 105b even where a number of first light beams 120a differs from a number of second light beams 120b. For example, data may be transferred via $N_1$ beams in the light beams 120a, and via $N_2$ beams in the light beams 120b. $N_1$ can be greater than, equal to, or less than $N_2$. As one example, four light beams 120a (i.e., $N_1$=4) could each transfer 2 bits of each byte of data. The light beams 120b may include 2 beams (i.e. $N_2$=2), one beam 120b transferring the most significant 4 bits and a second beam 120b the least significant 4 bits.

Additionally, the apparatus 115 may verify integrity of the data, e.g., whether the data is corrupted and/or whether transmitted data in a beam 120b is the same as data in a received beam 120a. As one example, the apparatus 115 may detect unexpected light intensity changes. As another example, the apparatus 115 may compare received and transmitted data and detect whether they are consistent, e.g., via one or more known techniques such as comparing checksums of received and transmitted data to determine whether the checksums are equal. Further, the apparatus 115 may transmit other data via the light beam 120b when received data is determined to be corrupt, incomplete, inaccurate, etc., to notify a receiver Li-Fi device 105b of such lack of data integrity, e.g., via known techniques such as a cyclic redundancy check (CRC).

The light converting circuit 125 included in the apparatus 115 may be an optoelectronic light converting circuit 125, such as is known. The optoelectronic light converter circuit 125 may convert the light beams, e.g., 120a, to electrical signals, process the electrical signals, and converts the processed electrical signals to optical light beams, e.g., 120b.

Figure 2A:
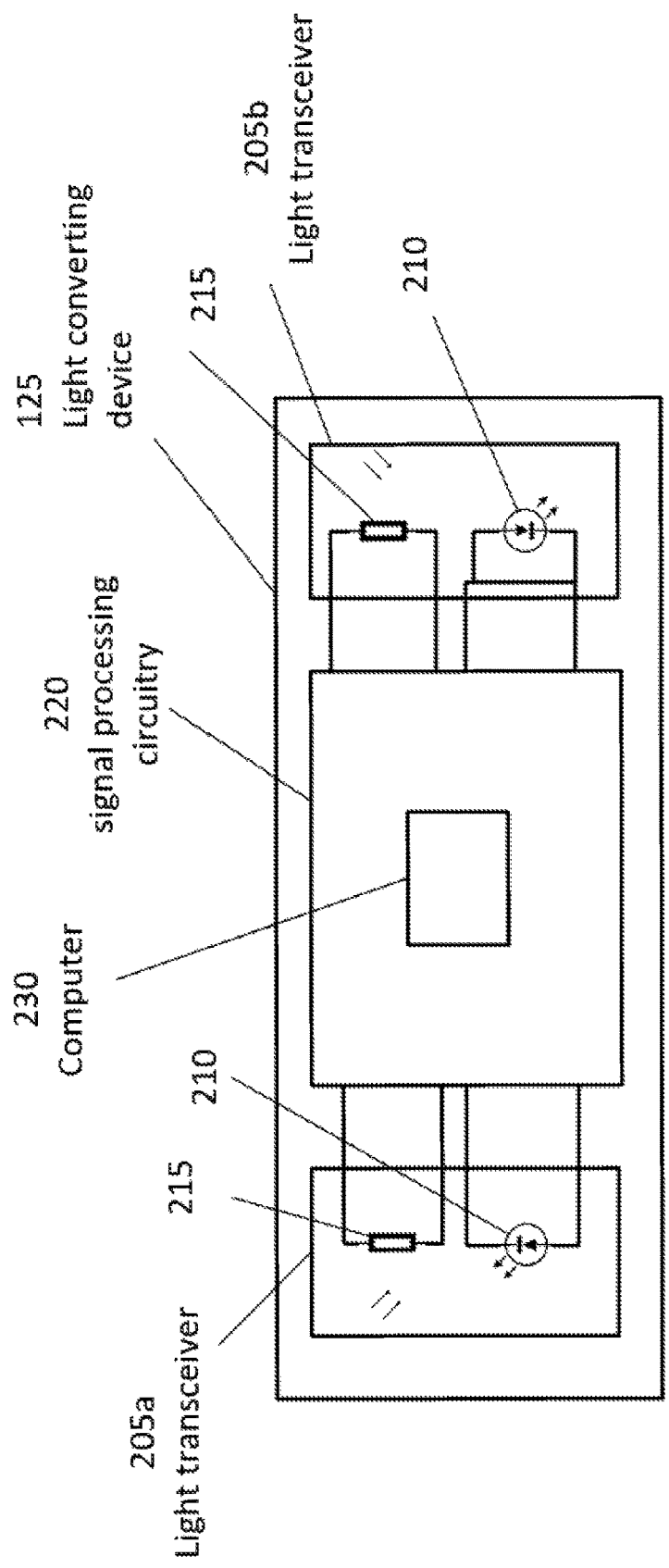
FIG. 2A is a schematic of an optoelectronic light converting circuit incorporated in the light converter apparatus of FIG. 1.

Now with reference to FIG. 2A, the optoelectronic light converter circuit 125 may include first and second light transceivers 205a, 205b, signal processing circuitry 220, and a computer 230 with a processor and memory. The computer 230 can be programmed to interpret, e.g., decode, a light beam 120a having a first wavelength, typically in the visible light spectrum, received in first light transceiver 205a to obtain data. The computer 230 can then encode the data to be transmitted by the second transceiver 205b in a light beam 120b. The data is then incorporated in the second light beam 120b at a second wavelength, typically in an invisible light spectrum.

Additionally, the optoelectronic light converter circuit 125 may provide bidirectional communication. In other words, the computer 230 can be further programmed to receive data via the second light transceiver 205b and transmit the data via the first light transceiver 205a.

The signal processing circuitry 220 may include known circuitry such as an amplifier. The amplifier may amplify signals received from the light transceivers 205 prior to being received by the computer 230. Alternatively or additionally, the amplifier may amplify signals outputted from the computer 230 prior to be transmitted by the light transceivers 205.

The first and the second light transceivers 205a, 205b are optically coupled to the optical interfaces 130a, 130b respectively. In one example, the first and/or second optical interfaces 130a, 130b may include first and/or second lenses optically focused on the light transceivers 205a, 205b.

The light transceivers 205a, 205b may include one or more light emitters 210, e.g., a LED (light emitting diode, as is known), and one or more light receivers 215, i.e., a light sensor such as photo resistor as is known. The computer 230 may be programmed to receive data via the light receiver 215, e.g., of the light transceiver 205a. The computer 230 may be programmed to transmit the data via the light emitter 210, e.g., of the light transceiver 205b. Alternatively or additionally, other types of light transceivers 205 may be used which include both receiving and transmitting components in one component, e.g., send and receive laser LEDs.

To transmit data included in the light beams 120a, 120b, the computer 230 may be programmed to change an intensity of a light beam 120. For example, the computer 230 may be programmed to change a state of a light beam, e.g., 120b, between an ON state and an OFF state. In one example, the computer 230 may be programmed to transmit binary data by changing the state of a light beam, e.g., 120b, to ON for transmitting a 1-bit and to OFF for transmitting a 0-bit. Analogously, the computer 230 may be programmed to receive data by determining an intensity of a light beam, e.g., 120a, determining a change in the intensity of the second light beam, and identifying the data at least partially based on the change in the intensity of the light beam, e.g., 120a. For example, the computer 230 may be programmed to receive a binary data by decoding an OFF state of a light beam, e.g., 120b, as a 0-bit and an ON state as a 1-bit.

Data encoded in a light beam, e.g., a light beam 120b, may be in an encrypted form. Encryption is a known technique of encoding messages or information in such a way that only authorized parties can read it. In one example, the apparatus 115 may receive encrypted data via the light beam 120a and transmit the encrypted data via the light beam 120b without decrypting or otherwise interpreting the data. In another example, the computer 230 may be programmed to decrypt or encrypt data, e.g., receiving encrypted data, encoded in the light beam 120a, decrypt the data, and transmit the decrypted data, via the light beam 120b to another device such as the Li-Fi device 105b. In such example, the computer 230 is programmed to receive information specifying details of an encryption method used to encrypt the data at a sender such as the Li-Fi device 105a. Additionally or alternatively, the computer 230 may be programmed to receive data, e.g., via the light beam 120b, encrypt the data, and transmit the encrypted data via the light beam 120a.

In order to configure the computer 230 to change the wavelength of the light beam 120, and possibly also to encrypt and/or to decrypt data, the computer 230 may be programmed to receive configuration data from, e.g., a Li-Fi device 105. In one example, the signal processing circuitry 220 may include a wireless communication interface such as Wi-Fi, Bluetooth®, etc. to receive configuration data from a Li-Fi device 105. Configuration data in this context means information used by the apparatus 115 to receive, interpret, and/or decode data received from a device 105. For example, the Li-Fi device 105b may communicate with the apparatus 115 to specify a wavelength range in an invisible light spectrum which the Li-Fi device 105b may use for communication, and/or to specify encryption parameters, e.g., a type of encryption and/or private key, such as is known. In another example, the apparatus 115 may use the light beams 120 to receive configuration data from Li-Fi devices such as 105b.

Additionally or alternatively, the computer 230 may be programmed to sweep through a range of wavelengths to determine a light spectrum range a device uses for Li-Fi communications. For example, the computer 230 may be programmed to emit light beams 120b with different wavelengths in visible and invisible light spectra encoded with data indicating a request to respond. Depending on a response received from a device such as the Li-Fi device 105b communicating only in an invisible light spectrum, the computer 230 may determine a wavelength range to be used to communicate with the Li-Fi 105b, i.e., the wavelength range for the light beam 120b.

Figure 2B:
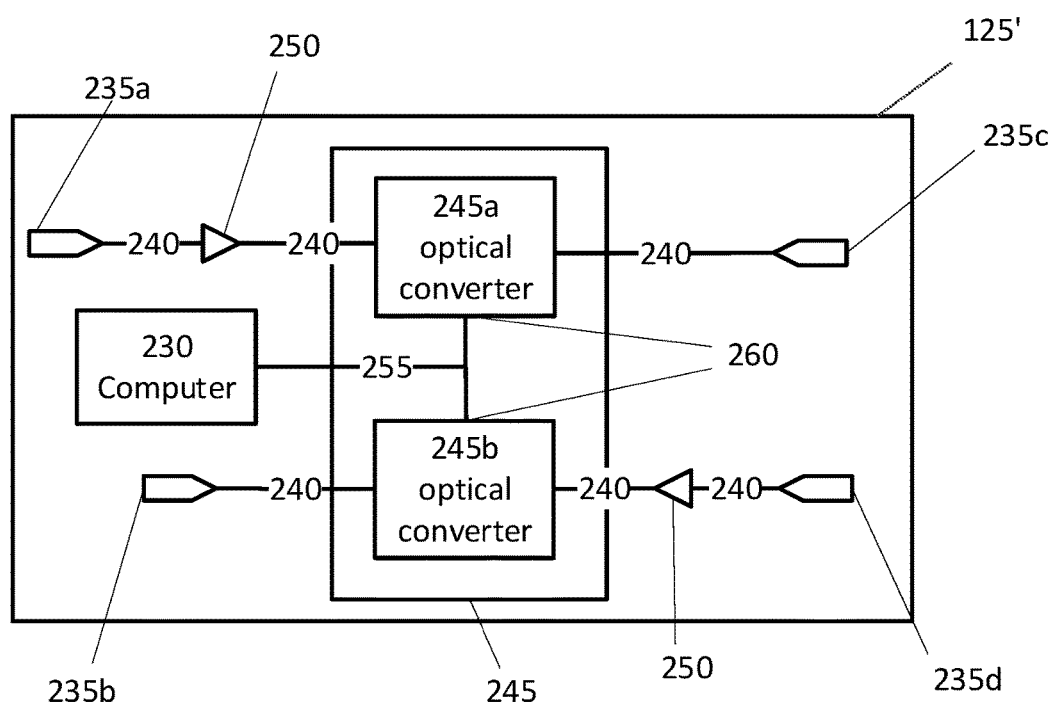
FIG. 2B is a schematic of an optical light converting circuit incorporated in the light converting apparatus of FIG. 1.

FIG. 2B illustrates an example of a light converting circuit 125' in which like elements have like numbers, and to which the above explanation applies unless noted otherwise below. The optical light converting circuit 125' is designated with a "prime" symbol to signify that it differs from the optoelectronic light converting circuit 125 in certain respects as explained below. For example, the optoelectronic light converting circuit 125 converts the optical light beams 120 to electrical signals to convert the light beam 120a to the light beam 120b, the beams 120a, 120b having different wavelengths. In contrast, the optical light converting circuit 125' converts the light beams 120a, 120b from a first to a second wavelength without any conversion of light beam to electrical signals. As with the optoelectronic light converting circuit 125, the optical light converting circuit 125' preserves encoded data while converting the light beams 120.

The optical light converting circuit 125' includes optical communication terminals 235 optically coupled with the apparatus 115 optical interfaces 130 and an optical converter 245 optically coupled to the optical communication terminals 235 via optical paths 240.

The optical communication terminals 235 provide optical connectivity between light beams 120 and the optical light converting circuit 125. As one example, the optical interfaces 130 may include lenses to focus light on the optical communication terminals 235. An optical interface 130 may be coupled to more than one optical communication terminal 235. For example, the optical interface 130a may be coupled to the optical communication terminal 235a for receiving the light beams 120a. The optical interface 130a may further be coupled to the optical communication terminal 235b for transmitting the light beams 120a.

The optical converter 245 may include one or more optical converters 245a, 245b. For example, two optical converters 245a, 245b may provide bidirectional communications, as shown in FIG. 2B. For example, the optical converter 245a may receive light beams 120a via the optical communication terminal 235a and output converted light beams 120b via the optical communication terminal 235c. Similarly, the optical converter 245b may receive the light beams 120b via the optical communication terminal 235d and output converted light beams 120a via the optical communication terminals 235b.

The optical paths 240 include an optical connection, e.g., a known medium such as a fiber optic material based connections to transfer optical signals. Accordingly, optical paths 240 may be formed of glass or plastic material suitable for transmitting optical signals.

The optical converters 245 may include optical semiconductor components, i.e., components receiving and outputting optical signals. As one example, an optical converter 245 may include optical transistors that switch optical signals, i.e., light incident on an optical transistor may activate the optical transistor to emit light. Fluctuations of an incoming light beam 120a that is at a first wavelength may trigger the optical converter 245a, e.g., an optical transistor based circuit, to emit a light beam 120b at a second wavelength. In other words, flashing or changes of intensity of an incoming light beam 120a may be duplicated, i.e., substantially identical, in the emitted light beam 120b, while the wavelength of the light beam 120b is changed to a second wavelength from a first wavelength of the beam 120a. "Duplicated" may for example mean that duration of ON or OFF states of a light beam 120a incoming to the optical converter 245 is identical to durations of ON or OFF states of a light beam 120b outgoing from the optical converter 245. Therefore, the data encoded in the light beams 120a is preserved while the light beam 120b second wavelength is different from the light beam 120a first wavelength.

The apparatus 115 may include optical amplifiers 250 to amplify an incoming light beam 120, e.g., incoming light beam 120a via the optical communication terminal 235a and incoming light beams 120b via the optical communication terminal 235d. Transmission of light via the optical interfaces 130, the optical communication terminals 235, and optical paths 240 may attenuate an intensity of an outgoing light beam 120. An attenuated light intensity may negatively affect operation of an optical converter 245. Additionally, amplification of light beams 120b may warranted to ensure that that the Li-Fi device 105b can receive outgoing light beams 120b. Additionally or alternatively, the optical amplifiers 250 may be included in the optical converters 245. In other words, the optical converters 245 may change the wavelength of and/or boost an intensity of light beams 120.

Additionally or alternatively, the optical converters 245 may include optical filters, e.g., an optical converter 245 may be configured in a known manner to block light beams in a predetermined light spectrum range. Additionally or alternatively, an optical converter 245 may be configured to pass light beams 120 within a predetermined light spectrum without any change of the light beams 120 wavelength. In other words, a light beam 120a of a wavelength within the predetermined light spectrum may pass through the optical converter 245 with no change of wavelength.

As discussed above with reference to FIG. 2A, the apparatus may be configurable, e.g., configuring a light spectrum used for communication with Li-Fi device 105b. The optical light converting circuit 125' may include a computer 230 electrically connected to the optical converters 245 via electrical connections 255. The computer 230 may be programmed to adjust the optical converters 245 to convert light in accordance with the received configuration information, e.g., outputting an adjustment electrical signal to an optical converter 245 control input 260 which may change the output light beam wavelength according to an adjustment electrical signal attribute such current, voltage, frequency, etc.

Process

Figure 3:
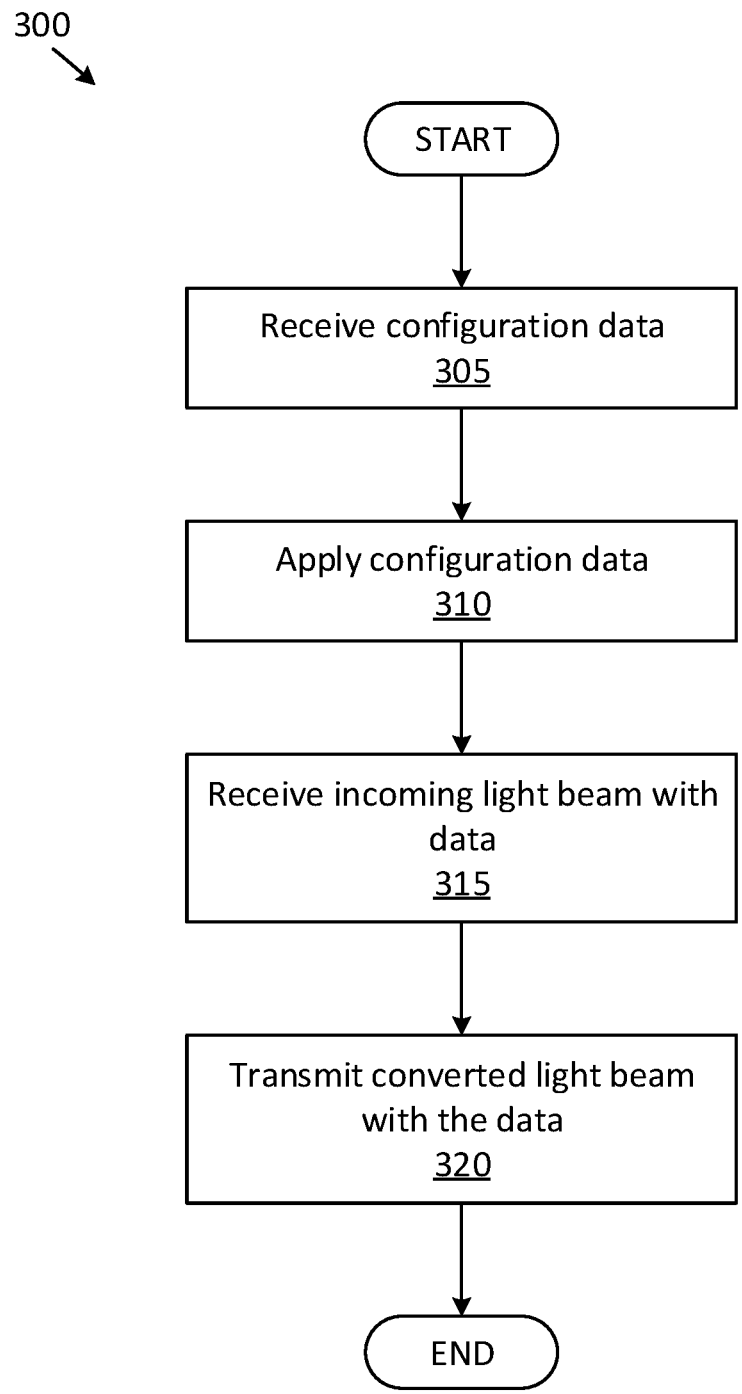
FIG. 3 is a flowchart of an exemplary process for converting light beams.

FIG. 3 illustrates an example process 300 for converting light beams 120 from a first wavelength to a second wavelength while data encoded in the light beams 120 are preserved. For example, the apparatus 115 optoelectronic light converting circuit 125 or optical light converting circuit 125' may be used for such conversion according to the process 300.

The process 300 begins in a block 305, in which the computer 230, e.g., included in a light converting circuit 125 or 125' as described above, receives configuration data as described above, e.g., via a wireless communication interface such Wi-Fi, Bluetooth®, Li-Fi, etc. Such configuration data may specify a light spectrum range used by a Li-Fi device 105. For example, the configuration information may include light spectrum ranges used by the Li-Fi devices 105a, 105b to communicate via Li-Fi.

Next, in a block 310, the computer 230 applies the configuration information. For example, the computer 230 may send electrical signals via electrical connections 255 to the optical converters 245 in an optical light converting circuit 125' to adjust the optical converters 245, e.g., to convert the light beam 120a at a first wavelength to the light beam 120b with a second wavelength. As another example, the computer 230 may store the configuration information in memory included in an optoelectronic light converting circuit 125 signal processing circuitry 220. The stored configuration information may be used in block 320 while transmitting a light beam 120.

Next, in a block 315, one or more light beams 120 with encoded data are received. In one example, an optoelectronic light converting circuit 125 computer 230 decodes data encoded in the light beam(s) 120a. The computer 230 may receive data based on determining states of the received light beam, e.g., ON or OFF states, and associating the states of the received light beam with data, e.g., binary bits of 0 and 1. For example, the computer 230 may be programmed to determine the state of the light beam 120 to be ON, when light beam 120 intensity exceeds a predetermined threshold, e.g., a predetermined luminous intensity threshold expressed in candela (cd) units; otherwise the state of the light beam 120 is OFF. In another example, an optical light converting circuit 125' may receive the light beam(s) 120a with encoded data via the optical light converting circuit 125' optical communication terminals 235. The received light beam(s) 120a with encoded date is transferred via the optical paths 240 to the optical converters 245. Additionally, the received light beams 120 may be amplified by the optical amplifiers 250.

Next, in a block 320, one or more converted light beams 120b with encoded data are transmitted via the optical interface 130b. In one example, the optoelectronic light converting circuit 125 computer 230 may be programmed to change an intensity of the light beam(s) 120b in accordance to the received data. The computer 230 may be further programmed to transmit the light beam 120b, in accordance with the configuration information received at the block 305. For example, the computer 230 may be programmed to output signals to the optoelectronic light converting circuit 125 light emitters 210 to output the light beams 120b in a second wavelength in an invisible light spectrum. Additionally, the computer 230 may be programmed to encrypt or decrypt the date prior to transmitting in accordance with the received configuration information, as explained above. In another example, optical light converting circuit 125' optical converter(s) 245 convert the received light beam 120a to a converted light beam 120b, while preserving the data encoded in the light beam 120. For example, the intensity changes, e.g., changes between ON and OFF state, of the received light beam 120a may be identically reflected in the converted light beam 120b. In another example, the optical light converting circuit 125' optical converter 245 may transmit light beam(s) 120b of a second wavelength in accordance with the applied configuration information. The data encoded in the light beams 120a are duplicated in the transmitted light beams 120b.

Following the block 320, the process 300 may finish or return to the block 305.

Thus, advantageously, the apparatus 115 may provide high speed communication between Li-Fi devices 105 while various Li-Fi devices 105 may communicate in different wavelength spectra, e.g., due to user preference, differences in lighting conditions surrounding the respective devices 105, and/or technical specification of Li-Fi devices 105. The apparatus 115 may thus provide beneficial flexibility in establishing Li-Fi communication among Li-Fi devices 105 in an environment such as home, office, etc.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. An apparatus, comprising:
first and second light transceivers; and a computer comprising a processor and a memory, the memory storing instructions executable by the processor such that the computer is programmed to:

receive first data via the first light transceiver, the first data incorporated in a first light beam having a first wavelength in a visible light spectrum; and transmit the first data via the second light transceiver, the data incorporated in a second light beam having a second wavelength in an invisible light spectrum.

2. The apparatus of claim 1, wherein the processor is further programmed to:

receive second data via the second light transceiver, the second data incorporated in the second light beam having the second wavelength; and transmit the second data via the first light transceiver, the second data incorporated in the first light beam with the first wavelength.

3. The apparatus of claim 1, wherein the first light transceiver includes a light emitter and a light receiver, and the processor is further programmed to:

receive the first data via the light receiver; and transmit second data via the light emitter.

4. The apparatus of claim 3, wherein the light emitter includes a Light Emitting Diode.

5. The apparatus of claim 1, wherein the processor is further programmed to transmit the first data at least partially by changing an intensity of the first light beam.

6. The apparatus of claim 5, wherein the processor is further programmed to change the intensity of the first light beam by changing a state of the first light beam between an ON state and an OFF state.

7. The apparatus of claim 1, wherein the processor is further programmed to receive the first data at least partially by sensing an intensity of the first light beam.

8. The apparatus of claim 1, wherein the processor is further programmed to receive the first data at least partially by:

determining an intensity of the first light beam;

determining a change in the intensity of the first light beam; and identifying the first data at least partially based on comparing the intensity of the first light beam to a predetermined luminous intensity threshold.

9. The apparatus of claim 1, further comprising a first lens optically coupled to the first light transceiver, and a second lens optically coupled to the second light transceiver.

10. The apparatus of claim 1, wherein the processor is further programmed to receive configuration data indicating at least one of the first wavelength, the second wavelength, and encryption parameters.

11. An apparatus, comprising:

first and second light transceivers; and a computer comprising a processor and a memory, the memory storing instructions executable by the processor such that the computer is programmed to:

receive first data via the first light transceiver, the first data incorporated in a first light beam having a first wavelength;

transmit the first data via the second light transceiver, the data incorporated in a second light beam having a second wavelength; and receive configuration data indicating at least one of the first wavelength, the second wavelength, and encryption parameters.

12. The apparatus of claim 11, wherein the processor is further programmed to receive the configuration data via a wireless communication interface.

13. The apparatus of claim 11, wherein the processor is further programmed to receive the configuration data via at least one of the first light beam and the second light beam.

14. The apparatus of claim 11, wherein the processor is further programmed to receive the first data in encrypted form and transmit the first data via the second light beam in decrypted form based at least partially on the encryption parameters.

15. The apparatus of claim 11, wherein the processor is further programmed to transmit the first data via the second light beam in encrypted form based at least partially on the encryption parameters.

16. An apparatus, comprising:

first and second light transceivers; and a computer comprising a processor and a memory, the memory storing instructions executable by the processor such that the computer is programmed to:

receive first data via the first light transceiver, the first data incorporated in a first light beam having a first wavelength; and transmit the first data via the second light transceiver, at least partially by changing an intensity of the first light beam, wherein the data is incorporated in a second light beam having a second wavelength.

17. The apparatus of claim 16, wherein the first wavelength is in a visible light spectrum and the second wavelength is in an invisible light spectrum.

18. An apparatus, comprising:

first and second light transceivers; and a computer comprising a processor and a memory, the memory storing instructions executable by the processor such that the computer is programmed to:

receive first data via the first light transceiver, at least partially by sensing an intensity of the first light beam, wherein the first data is incorporated in a first light beam having a first wavelength; and transmit the first data via the second light transceiver, the data incorporated in a second light beam having a second wavelength.

19. The apparatus of claim 18, wherein the first wavelength is in a visible light spectrum and the second wavelength is in an invisible light spectrum.

* * * * *